(12) United States Patent
Duval

(10) Patent No.: US 7,681,658 B2
(45) Date of Patent: Mar. 23, 2010

(54) PNEUMATIC IMPACT TOOL

(75) Inventor: Maurice Duval, 533, rue des Crécerelles, Chicoutimi, QC (CA) G7H 5W9

(73) Assignees: Maurice Duval, Chicoutimi (Québec) (CA); Roch Larouche, Jonquiére (Québec) (CA)

( * ) Notice: Subject to any disclaimer, the term of this patent is extended or adjusted under 35 U.S.C. 154(b) by 43 days.

(21) Appl. No.: 11/935,537

(22) Filed: Nov. 6, 2007

(65) Prior Publication Data

US 2009/0114409 A1    May 7, 2009

(51) Int. Cl.
*E21B 7/00* (2006.01)
*B25D 17/00* (2006.01)

(52) U.S. Cl. ............... 173/1; 173/200; 173/206; 173/207; 173/208; 173/210; 173/212; 173/218

(58) Field of Classification Search ........ 173/1, 173/200, 206–208, 210, 212, 218
See application file for complete search history.

(56) References Cited

U.S. PATENT DOCUMENTS

| | | | |
|---|---|---|---|
| 450,782 A | | 4/1891 | Laun |
| 520,915 A | | 6/1894 | Chouteau |
| 1,416,086 A | | 5/1922 | Wolfe |
| 1,665,046 A | | 4/1928 | Tucker |
| 3,266,581 A | | 8/1966 | Cooley et al. |
| 3,754,396 A | * | 8/1973 | Erma ................... 60/563 |
| 3,865,200 A | | 2/1975 | Schmidt |
| 3,892,280 A | * | 7/1975 | Klushin et al. ........ 173/162.1 |
| 3,991,835 A | * | 11/1976 | Bailey et al. ............ 173/206 |
| 4,018,291 A | | 4/1977 | Anderson |
| 4,121,672 A | | 10/1978 | Tkach et al. |
| 4,236,588 A | * | 12/1980 | Moldan et al. ............ 173/48 |
| 4,284,147 A | | 8/1981 | Jenne |
| 4,366,868 A | | 1/1983 | Salmi |
| 4,416,338 A | * | 11/1983 | Nelson et al. ............ 173/206 |
| 4,505,340 A | * | 3/1985 | Yantsen et al. ........... 173/208 |
| 4,651,833 A | | 3/1987 | Karpf et al. |
| 4,658,913 A | * | 4/1987 | Yantsen et al. ........... 173/208 |
| 4,693,322 A | | 9/1987 | Gartside |
| 4,739,837 A | | 4/1988 | Maslakov et al. |
| 4,840,237 A | | 6/1989 | Roemer |
| 4,886,128 A | | 12/1989 | Roemer |

(Continued)

FOREIGN PATENT DOCUMENTS

GB    1246357    9/1971

(Continued)

*Primary Examiner*—Brian D Nash
(74) *Attorney, Agent, or Firm*—Ogilvy Renault, LLP

(57) ABSTRACT

A pneumatic impact tool includes a housing, an accumulation chamber, and a piston. The housing defines a longitudinal passageway with a rear end and a front end and a passageway gas port. The accumulation chamber has a accumulation chamber gas port connectable to a gas supply and a inner gas port in fluid communication with the longitudinal passageway. The piston is inserted in the longitudinal passageway and slides between a rest position wherein the piston is juxtaposed to the rear end of the longitudinal passageway and an impact position wherein the piston is juxtaposed to the front end of the longitudinal passageway. The piston moves from the rest position to the impact position when gas is inserted in the longitudinal passageway through the passageway gas port and is propelled therebetween by pressurized gas contained in the accumulation chamber.

27 Claims, 7 Drawing Sheets

U.S. PATENT DOCUMENTS

| | | |
|---|---|---|
| 4,981,181 A | 1/1991 | Hesse |
| 5,088,566 A | 2/1992 | Gustafsson et al. |
| 5,111,890 A * | 5/1992 | Ranger et al. ............... 173/104 |
| 5,148,878 A | 9/1992 | Schmidt et al. |
| 5,234,061 A | 8/1993 | Hesse |
| 5,305,837 A * | 4/1994 | Johns et al. .................. 175/61 |
| 5,407,018 A | 4/1995 | Henry |
| 5,417,294 A * | 5/1995 | Suher ......................... 173/15 |
| 5,562,170 A * | 10/1996 | Wolfer et al. ............... 175/296 |
| 5,695,014 A | 12/1997 | Jenne |
| 5,937,956 A | 8/1999 | Hesse |
| 6,095,256 A | 8/2000 | Lindsay |
| 6,155,353 A * | 12/2000 | Ottestad .................... 173/128 |
| 6,227,307 B1 * | 5/2001 | Lee ............................. 173/78 |
| 6,609,577 B2 * | 8/2003 | Beccu ...................... 173/93.6 |
| 6,675,908 B1 * | 1/2004 | Frauhammer et al. ......... 173/48 |
| 6,691,798 B1 * | 2/2004 | Lindsay .................... 173/115 |
| 6,938,705 B2 * | 9/2005 | Kikuchi .................... 173/201 |

FOREIGN PATENT DOCUMENTS

| | | |
|---|---|---|
| JP | 2001287175 | 10/2001 |

* cited by examiner

PNEUMATIC IMPACT TOOL

FIELD OF THE INVENTION

The invention relates to power impact tools and, more particularly, to pneumatic impact tools.

DESCRIPTION OF THE PRIOR ART

Power impact tools (e.g., pneumatic, hydraulic, electric, etc.) are well known in the art and produce forces on a workpiece by direct or indirect impact of a hammer. In pneumatic impact tools, the hammer is driven by compressed air.

Pneumatic impact tools have several moving parts which require continual maintenance. As it is well known, maintenance is a time consuming operation. There is thus a need for a pneumatic impact tool which will include less moving parts for reducing maintenance time and costs.

BRIEF SUMMARY OF THE INVENTION

It is therefore an aim of the present invention to address the above mentioned issues.

According to a general aspect, there is provided a pneumatic impact tool. The pneumatic impact tool comprises: a housing defining a longitudinal passageway with a front end and a rear end, an accumulation chamber in fluid communication with the longitudinal passageway proximate to the rear end, an accumulation chamber gas port in fluid communication with the accumulation chamber, and a passageway gas port in fluid communication with the longitudinal passageway proximate to the rear end; and a piston inserted in the longitudinal passageway and movable between an impact position wherein the piston is proximate to the front end and a rest position wherein the piston is proximate to the rear end. The piston prevents fluid communication between the longitudinal passageway and the accumulation chamber and the passageway gas port is in fluid communication with the longitudinal passageway, rearwardly of the piston, in the rest position. The longitudinal passageway and the accumulation chamber are in fluid communication, in the impact position of the piston.

According to another general aspect, there is provided a method for operating an impact tool. The method comprises: maintaining a piston in a rest position proximate to a rear end of a longitudinal passageway defined in the impact tool, the piston being slidably inserted in the longitudinal passageway and preventing fluid communication between an accumulation chamber and the longitudinal passageway; inserting pressurized gas in an accumulation chamber of the impact tool; and increasing the pressure in the longitudinal passageway rearwardly of the piston, upon receiving an activation signal, the piston sliding in the longitudinal passageway from a rear position to an impact position, propulsed by the pressurized gas of the accumulation chamber.

According to another general aspect, there is provided a pneumatic impact tool. The pneumatic impact tool comprises: a housing defining a longitudinal passageway with a rear end and a front end and a passageway gas port, proximate to the rear end, connectable to a gas supply; an accumulation chamber having an accumulation chamber gas port connectable to a gas supply for injecting pressurized gas therein and at least one inner gas port in fluid communication with the longitudinal passageway; and a piston inserted in the longitudinal passageway and sliding therein between a rest position wherein the piston is juxtaposed to the rear end of the longitudinal passageway and seals the at least one inner gas port of the accumulation chamber and an impact position wherein the piston is juxtaposed to the front end of the longitudinal passageway and the accumulation chamber and the longitudinal passageway are in fluid communication through the at least one inner gas port. The piston moves from the rest position to the impact position when gas is inserted in the longitudinal passageway through the passageway gas port and is propelled therebetween by pressurized gas contained in the accumulation chamber.

BRIEF DESCRIPTION OF THE DRAWINGS

It will be noted that throughout the appended drawings, like features are identified by like reference numerals.

DETAILED DESCRIPTION

Figure 1:
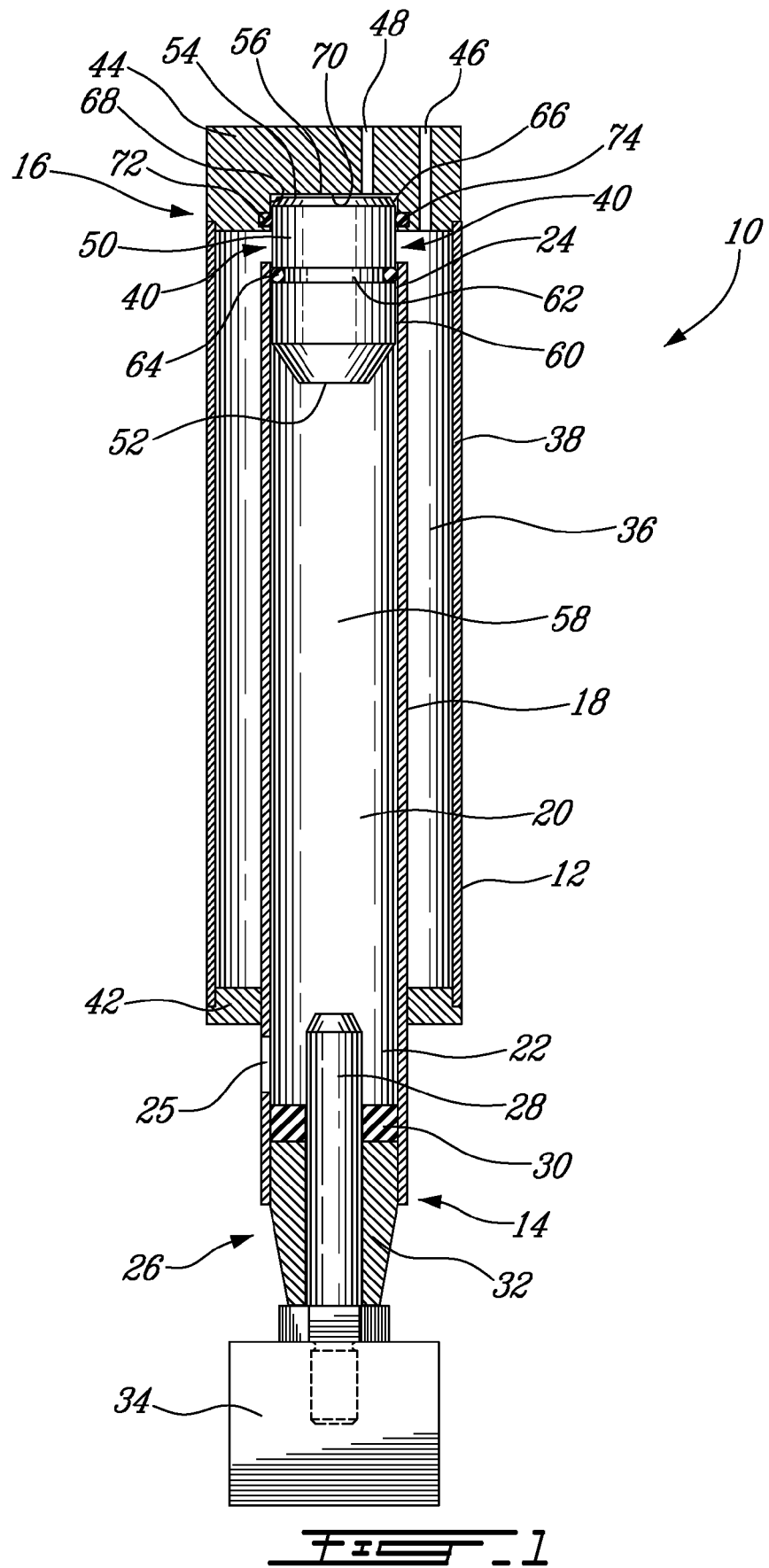
FIG. 1 is a sectional view of a pneumatic impact tool in accordance with an embodiment of the invention, wherein a piston is in a rest position and an accumulation chamber surrounds a longitudinal passageway.
Figure 2:
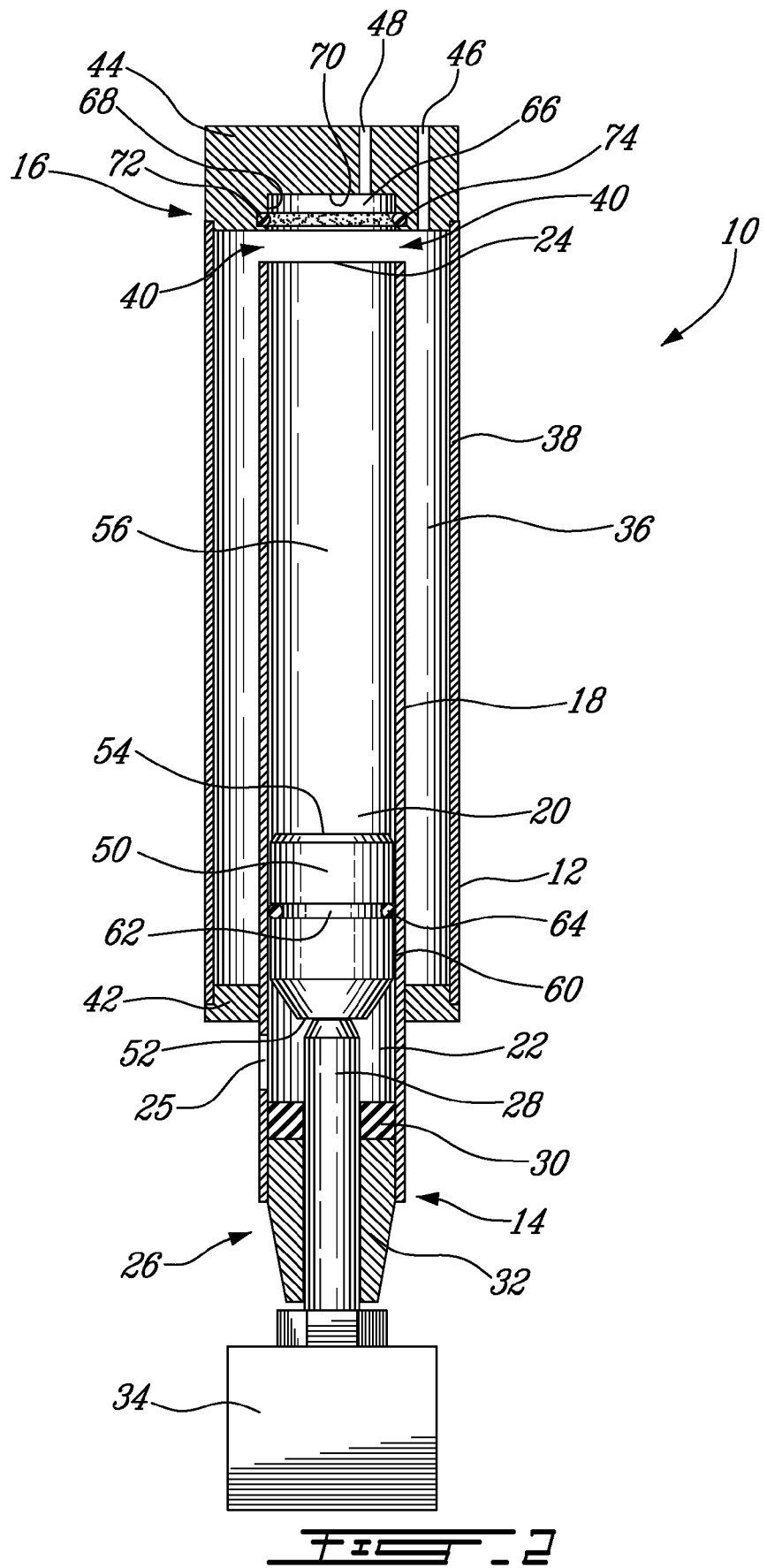
FIG. 2 is a sectional view of the pneumatic impact tool shown in FIG. 1, wherein the piston is in an impact position.

Referring now to the drawings and, more particularly, referring to FIGS. 1 and 2, it will be seen a pneumatic impact tool 10 in accordance with an embodiment. The pneumatic impact tool 10 has a housing 12 having a substantially cylindrical shape with a front end 14 and a rear end 16. The housing 12 has an inner peripheral wall 18 which defines a longitudinal passageway 20, or pathway, therein. The longitudinal passageway 20 has a cylindrical shape with a front end 22 and a rear end 24.

A vent 25 is defined in the inner peripheral wall 18 of the housing 12, proximate to the front end 22. The vent 25 allows gas to flow therethough as it will be described in greater detail below.

A head 26 is mounted to the front end 14 of the housing 12. The head 26 has a tool holder 28 extending in the longitudinal passageway 20, a damper 30, and a tool guide 32, which will be described in greater detail below. The tool holder 28 extends above the vent 25. The head 26 is adapted to receive a tool 34 thereon.

The pneumatic impact tool 10 also includes an accumulation chamber 36 defined by an outer peripheral wall 38 and surrounding the longitudinal passageway 20. The accumulation chamber 36 and the longitudinal passageway 20 are concentric with one another and extend substantially parallel to one another. Proximate to the rear end 16 of the tool 10, the accumulation chamber 36 and the longitudinal passageway 20 are in fluid communication through a pressure transmission aperture 40. The aperture 40 has an annular shape with a diameter substantially corresponding to the diameter of the passageway 20.

The front end of the accumulation chamber 36 is sealed with an end ring 42 while the rear end of the accumulation chamber 36 is sealed with an end cap 44. The end cap 44 also defines the end of the longitudinal passageway 20.

An accumulation chamber gas port 46 (or accumulation gas port) extends through the end cap 44 and is in fluid communication with the accumulation chamber 36, even when the aperture 40 is sealed by the piston 50 as it will be described in greater detail below. The accumulation gas port 46 is connectable to a pressurized gas supply (not shown). A passageway gas port 48 also extends through the end cap 44 and is in fluid communication with the longitudinal passageway 20. The passageway gas port 48 is connectable to a gas blower (not shown) for selectively blowing gas into and aspiring gas from the longitudinal passageway 20, proximate to the rear end 24. It is appreciated that gas can flow in both directions (inwardly and outwardly) in both the accumulation gas port 46 and the passageway gas port 48. Moreover, the pressurized gas supply and the gas blower can be a single or several pneumatic circuits, as it will be described in more details below.

A piston 50, or hammer, is inserted in the longitudinal passageway 20. The piston 50 is slidably mounted therein and slides between an impact position (FIG. 2) wherein the piston is proximate to the front end 14 and a rest position wherein the piston is proximate to the rear end 16 (FIG. 1). The piston 50 has a front end 52 which abuts the tool holder 28 in the impact position and an opposed rear end 54. In this particular embodiment, the piston 50 has a cylindrical shape with a conical section extending rearwardly from the front end 52, and has a substantially flat rear end 54 which is made to abut against the rear end 24 of the passageway 20 in the rest position.

In the rest position, the piston 50 divides the longitudinal passageway 20 into a suction section or chamber 56, extending from the rear end 54 of the piston 50 towards the rear end 24 of the passageway 20, and a propulsion section or channel 58, extending from the front end 52 of the piston 50 towards the front end 22 of the passageway 20. In the embodiment illustrated, the piston 50 can be abutted to the end cap 44, and the suction chamber 56 is thus limited to the passageway gas port 48 and any gap left between the piston 50 and the end cap 44. However, it is to be understood that using a larger suction chamber can be advantageous in certain applications.

The piston 50 has a peripheral wall 60 with an annular groove 62 extending therein along its periphery. In the rest position of the piston 50, the groove 62 is located below the annular aperture 40, extending between the accumulation chamber 36 and the longitudinal passageway 20. An annular passageway seal 64 is inserted into the groove 62. The passageway seal 64 provides an air-tight connection between the piston 50 and the inner peripheral wall 18. In the rest position, the passageway seal 64 prevents gases from flowing from the accumulation chamber 36 into the propulsion section 58 of the passageway 20. Moreover, while the piston 50 slides in the passageway 20, the passageway seal 64 prevents gases from flowing from the suction section 56 to the propulsion section 58 or vice-versa.

The end cap 44 has a cavity 66 extending therein and defined by a peripheral wall 68 and a bottom wall 70. The cavity 66 prolongs the longitudinal passageway 20 of the tool 10. In the rest position, a section of the piston 50, contiguous to its rear end 54, is inserted into the cavity 66. An annular groove 72 extends inwardly in the peripheral wall 68 of the end cap 44. Another annular seal 74 is inserted into the groove 72. The seal 74 provides an air tight connection between the piston 50 and the peripheral wall 68 of the end cap 44. In the rest position, the seal 74 prevents gases from flowing from the accumulation chamber 36 into the suction section 56 of the passageway 20.

As mentioned above, the aperture 40 has an annular shape. Therefore, the aperture 40 is uniformly distributed along the periphery of the piston 50, in the rest position, and the pressure applied by a gas located in the accumulation chamber 36 is also uniformly distributed along the perimeter of the piston 50.

As mentioned above, the tool holder 28 includes a longitudinal rod member having a section which extends in the longitudinal passageway 20 and on which the piston 50 abuts in the impact position.

The damper 30 has an annular shape and surrounds the tool holder 28. The damper 30 is mounted to a rear end of the tool guide 32 which also surrounds the tool holder 28. The tool guide 32 has a cylindrical shape with a conical section extending rearwardly from its front end. The damper 30 is optional, and acts to absorb the shock between the piston 50 and the tool guide 32 in the absence of the tool holder.

Finally, a tool 34, which can be adapted for marking, piercing, shearing, punching, forming, stamping, flanging, riveting, printing, pressing, embossing, nailing, clinching and the like, is mounted to an end of the tool holder 28 and abuts the front end of the tool guide 32.

Figure 3:
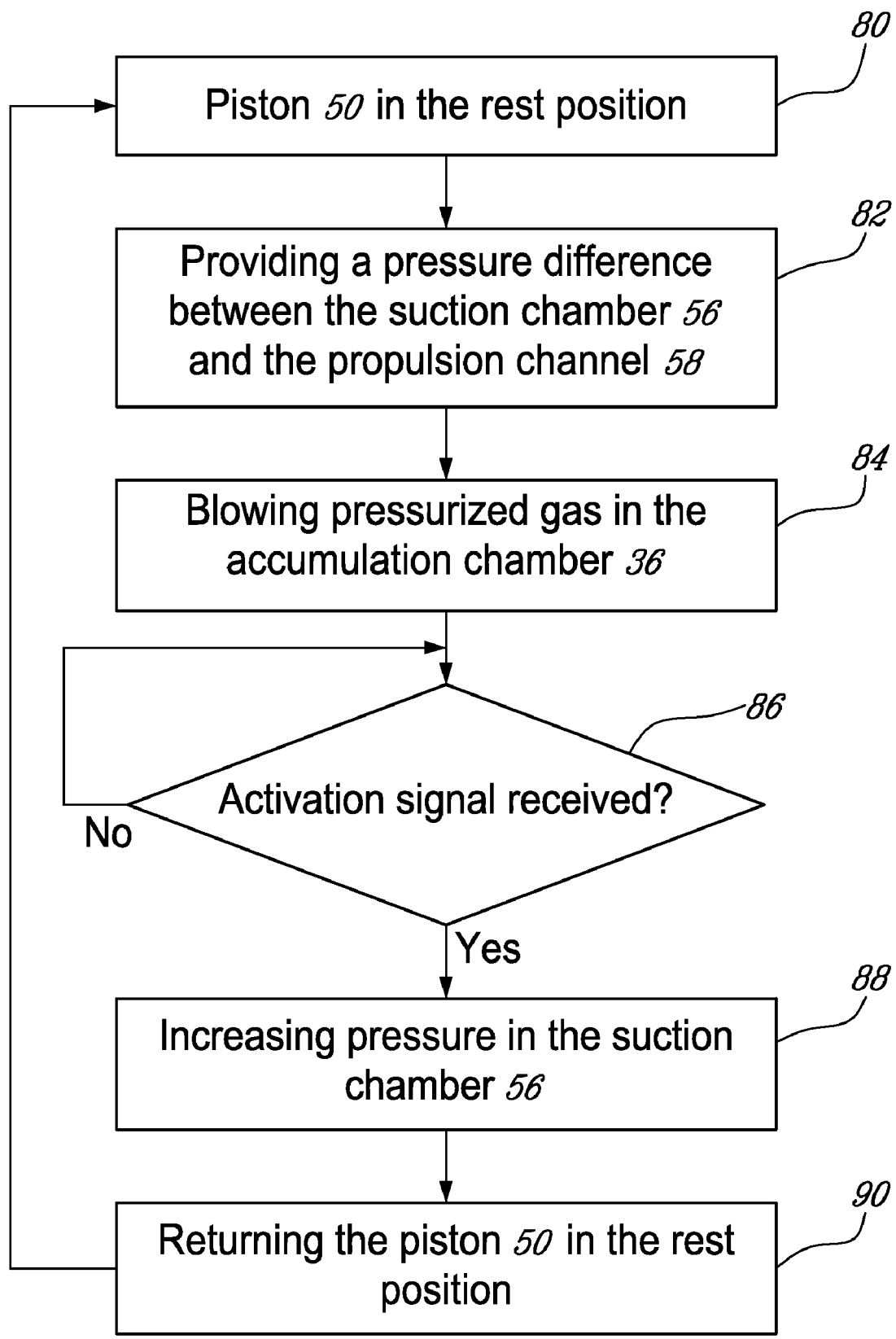
FIG. 3 is a flow chart illustrating an impact cycle of the pneumatic impact tool shown in FIG. 1.

Referring now to FIG. 3, an impact cycle will be described. For the purpose of the example, the impact cycle will begin with the piston 50 in the rest position 80. However, a person skilled in the art will appreciate that the impact cycle can begin anywhere along the cycle.

In the rest position, the piston 50 is located proximate to the rear end 16 of the tool 20 and divides the passageway 20 into the suction chamber 56 and the propulsion channel 58. The seals 64, 74 prevent gases from flowing between the accumulation chamber 36 and either the propulsion channel 58 and the suction chamber 56. A pressure difference is provided 82 between the suction chamber 56 and the propulsion channel 58 to maintain the piston 50 in the rest position. The pressure in the suction chamber 56 is lower than the pressure in the propulsion channel 58. In the embodiment shown, the pressure in the propulsion channel 58 is the atmospheric pressure. Therefore, gases are withdrawn from the suction chamber 56 through the passageway gas port 48. A vacuum or a partial vacuum can be created in the suction chamber 56 to maintain the piston 50 in the rest position. As mentioned above, the passageway gas port 48 can be connected to a pneumatic circuit or a gas blower (not shown) for selectively blowing gas into and aspiring gas from the longitudinal passageway 20.

While the piston 50 is in the rest position, pressurized gas is blown 84 in the accumulation chamber 36 through the accumulation gas port 46. As mentioned above, the accumulation gas port 46 is connectable to a pressurized gas supply. The pressurized gas applies a uniformly distributed pressure on the periphery of the piston 50 through the aperture 40. Since the fluid communication is prevented between the accumulation chamber 36, the suction chamber 56, and the propulsion channel 58 by the seals 64, 74 and a pressure difference is provided between the suction chamber 56 and the propulsion channel 58, the piston 50 remains in the rest position. No additional retaining mechanism is required to maintain the piston 50 in the rest position.

When an activation signal is received 86, gas is blown 88 into the suction chamber 56, through the passageway gas port 48, until the pressure therein is equal or superior to the pressure present in the propulsion channel 58, and the piston is slid out from the cavity 66 toward the propulsion section 58. The pressure in the accumulation chamber 36 is thereafter applied to the rear end 54 of the piston 50, and a resulting pressure differential between the rear end 54 and the front end 52 of the piston 50 propels the piston along the passageway 20 and into an impact with the tool holder 28. The piston displacement work is thus provided by the expansion of the pressurized gas into the suction section 56 of the passageway 20. The seal 64, inserted in the groove 62 of the piston 50 and moving along the passageway 20 therewith, prevents the pressurized gas from flowing between the piston 50 and the inner peripheral wall 18 without propelling the piston 50 along the passageway 20. The gas, initially contained in the propulsion channel 58, exits therefrom through the vent 25.

When impacting the tool holder 28, the piston 50 also impacts the tool 34 mounted thereto. The speed of the piston 50 in the longitudinal passageway and, consequently, the resulting impact force on the tool 34 is, amongst others, controlled by the pressure of the pressurized gas in the accumulation chamber 36.

Once an impact is provided on the tool 34, the piston 50 returns 90 in the rest position. There are several ways for returning the piston 50 from the impact position to the rest position. For example, it is possible to blow gas into the vent 25 or to draw air through the passageway gas port 48 and/or the accumulation gas port 46 to create a pressure difference between both sections of the passageway 20 to provide a resulting returning force on the piston 50. Therefore, the vent 25 can be connected to a gas supply for blowing gas therein to displace the piston 50 inside the passageway 20. The gas contained in the accumulation chamber 36 and the passageway 20 can flow outwardly of the tool 10 through the accumulation gas port 46 and/or the passageway gas port 48.

Therefore, it is appreciated that the pressure difference between the suction chamber 46 and the propulsion channel 48 can be created before the piston 50 is positioned in the rest position but for positioning the piston 50 in the rest position. The pressure difference can also be created simultaneously while positioning the piston 50 in the rest position.

Once the piston 50 is in the rest position, another impact cycle can begin. The impact cycle can be divided in two parts: a loading part where the piston 50 is in the rest position and gas is blown into the accumulation chamber 36 and an unloading part which begins when the activation signal is received and the piston 50 is slid out from the cavity 66, along the longitudinal passageway 20, to impact the head 26.

Figure 4:
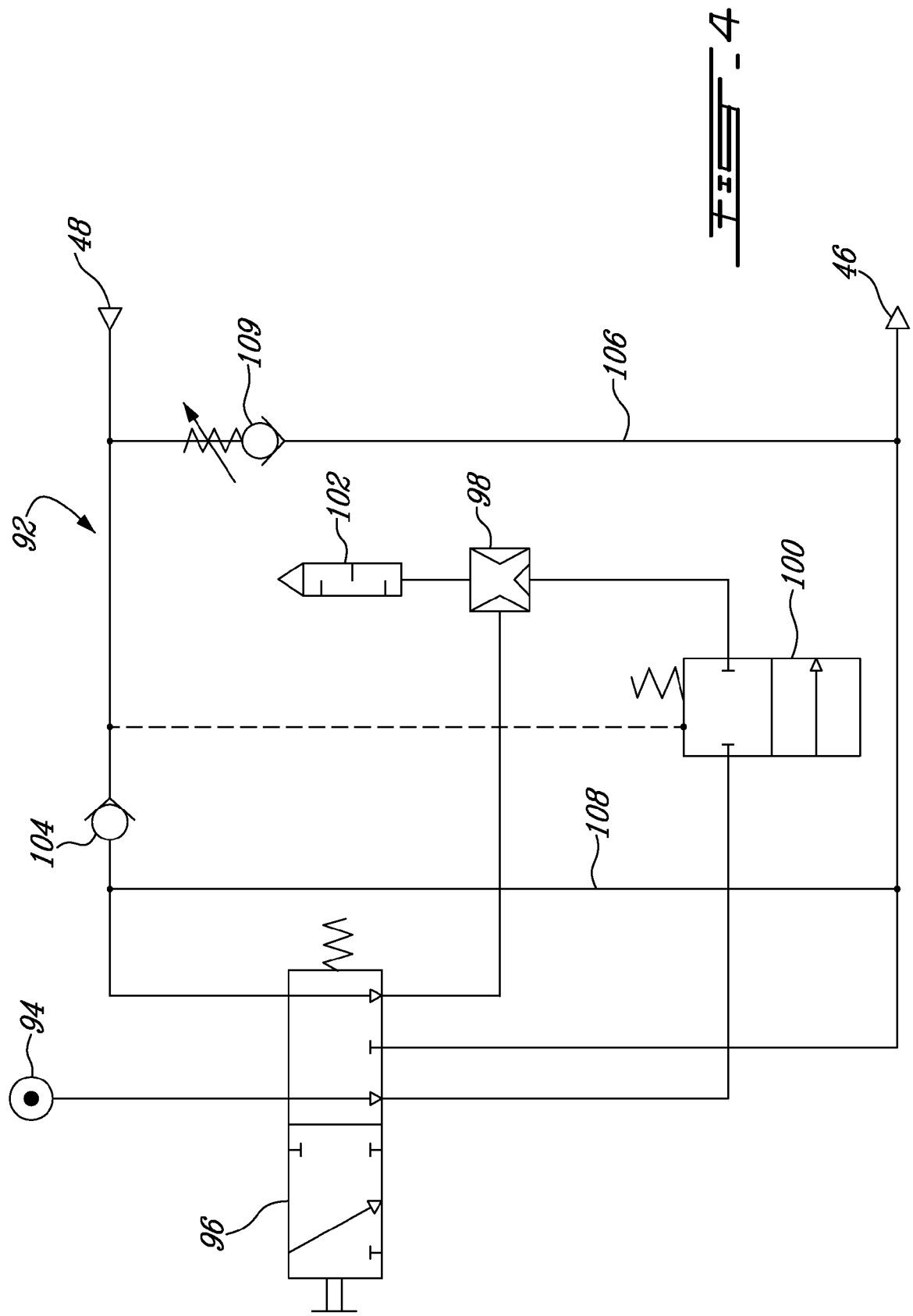
FIG. 4 is a schematic pneumatic circuit for the pneumatic impact tool shown in FIG. 1, wherein the pneumatic circuit includes a venturi.

Referring to FIG. 4, an example of a pneumatic circuit 92 connectable to the tool 10 and, more particularly, to the accumulation gas port 46 and the passageway gas port 48 for selectively blowing gas therein and withdrawing gas therefrom is shown. The pneumatic circuit 92 includes a pressurized gas supply 94 in fluid communication with a first valve 96. The first valve 96 is a five-way valve with two configurations or states. It is preferably biased to remain in the first configuration by default, but is activatable to switch to the second configuration. In the first configuration (which is illustrated), the first valve 96 offers fluid communication between the pressurized gas supply 94 and a second valve 100, whereas in the second configuration, the first valve 96 offers fluid communication between the pressurized gas supply 94 and the accumulation gas port 46. In this example, the first valve 96 is manually activatable to switch between the first and second configurations.

The second valve 100 is a two-way valve with two configurations, and is preferably biased to remain in the first configuration by default (it is shown in the second configuration). In the first configuration, the second valve 100 allows fluid communication between the first valve 96 and a venturi pump 98 and, in the second configuration, the second valve 100 prevents fluid communication between the first valve 96 and the venturi pump 98, as shown in FIG. 4. The second valve 100 is activatable to switch between the first and second state by vacuum, as it will be explained below.

The venturi pump 98 is connected to the accumulation gas port 46 and to a check valve 104 via the first valve 96 when in the first configuration, but this connection is broken when the first valve 96 is switched to the second configuration. The check valve 104 leads to the passageway gas port 48. A gas channel 108 is provided between the first valve 96 and the accumulation gas port 46, and a gas channel 106 is provided between the accumulation gas port 46 and the passageway gas port 48. The gas channel 106 has a clack valve 109 which is normally kept closed but which is opened when a predetermined pressure threshold is achieved between the accumulation gas port 46 and the passageway gas port 48. The venturi pump 98 is in fluid communication with a silencer 102 to reduce the noise generated by the venturi pump 98.

In use, when the first valve 96 is in the first configuration such as illustrated, and the second valve 100 is in the first configuration (not illustrated), the venturi pump 98 is activated by the pressurized gas 94 and creates a vacuum through the accumulation chamber port 46 and through the passageway chamber port 48 via the check valve 104. This vacuum pulls the piston 50 to the rest position (FIG. 1).

Once the piston 50, the vacuum continues to increase until a threshold vacuum is reached which switches the second valve 100 into the second configuration (illustrated) to cut the pressurized gas supply to the venturi pump 98. This is schematically depicted by the dotted line in FIG. 4. It will thus be understood that the second valve 100 is optional, but its use is advantageous since it allows to save on the use of pressurized gas by stopping the venturi pump when its action is no longer needed.

The vacuum in the passageway gas port preferably results in a sufficient pressure differential between the propulsion section 58 and the passageway gas port 48 to maintain the piston 50 in the rest position (FIG. 1) even during normal movement and orientation change of the tool.

To blow air into the accumulation chamber, the first valve 96 is switched into the second configuration (not illustrated) to provide gas flow communication between the pressurized gas supply 94 and the accumulation chamber port 46. When a predetermined threshold pressure is reached in the accumulation chamber, the clack valve 109 is activated and the vacuum of the passageway port 48 is destroyed, thus freeing the piston 50 from the cavity 66 as described above. In this case, the activation signal can thus be seen as the threshold pressure being reached in the clack valve.

Figure 5:
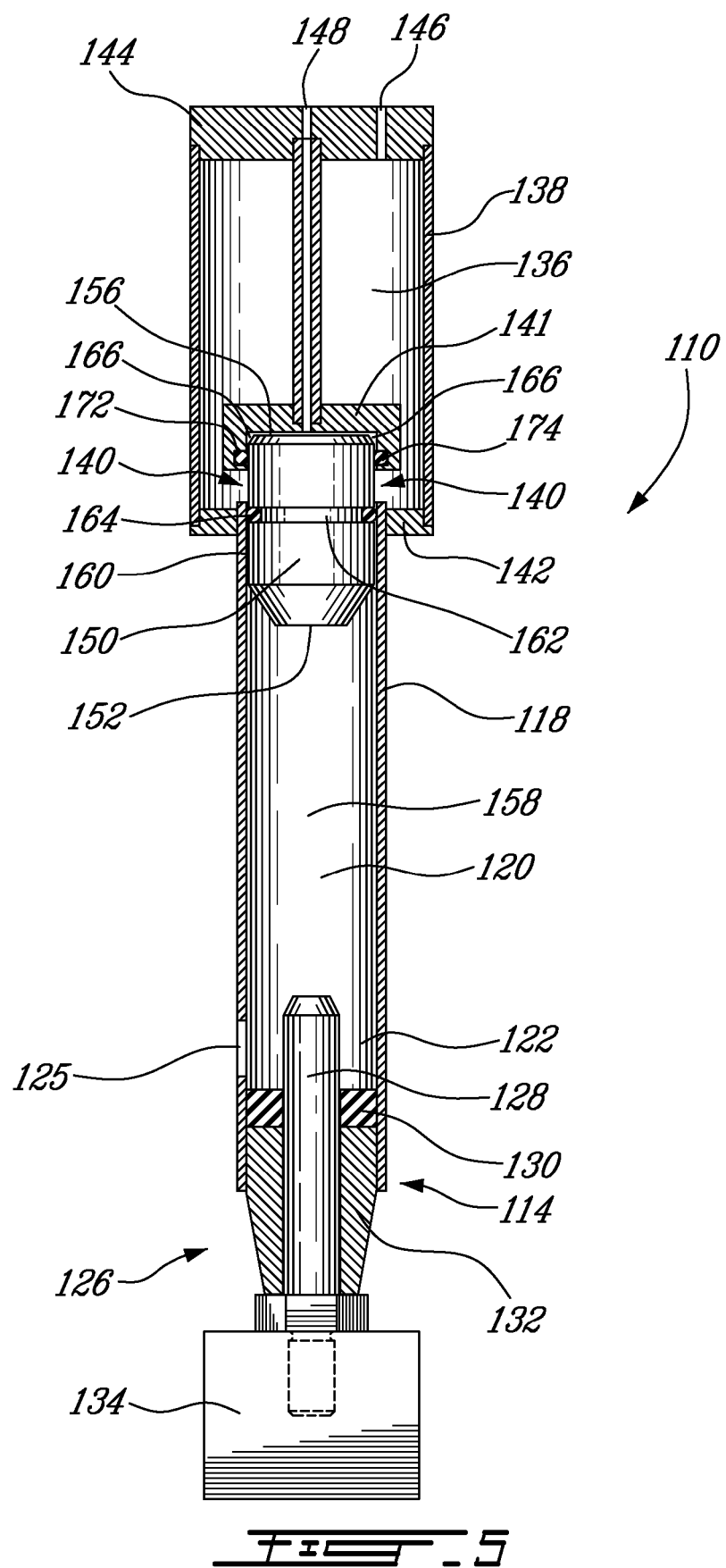
FIG. 5 is a sectional view of a pneumatic impact tool in accordance with another embodiment of the invention, wherein the accumulation chamber is located rearwardly of the longitudinal passageway.

Referring now to FIG. 5, it will be seen an alternate embodiment to the pneumatic impact tool 10 of FIGS. 1 and 2. The features are numbered with reference numerals which correspond to the reference numerals of the previous embodiment where applicable but reference numerals in the 100 series are used instead.

In this embodiment, the accumulation chamber 136 is located at the rear of the longitudinal passageway 120. As for the tool 10, the tool 110 includes a longitudinal passageway 120 in which a piston 150 slides between a rest position and an impact position. In FIG. 5, the piston 150 is in the rest position.

The accumulation chamber 136 is defined by an outer peripheral wall 138 and, as mentioned above, is located rearwardly of the longitudinal passageway 120. A housing 141 is inserted in the accumulation chamber 136 and defines the rear end of the passageway 20. The housing 141 has a cavity 166 extending therein and defined by a peripheral wall and a bottom wall. The cavity 166 prolongs the longitudinal passageway 120 of the tool 110. In the rest position, a section of the piston 150 is inserted into the cavity 166. As for the end cap 44, an annular groove 172 extends inwardly in the peripheral wall of the housing 141 and an annular seal 174 is inserted into the groove 172. The seal 174 provides an air tight connection between the piston 150 and the peripheral wall of the housing 141.

The accumulation chamber 136 and the longitudinal passageway 120 are in fluid communication through a gas port 140 with an annular shape.

As for the accumulation chamber 36, the front end of the accumulation chamber 136 is sealed with an end ring 142 while the rear end of the accumulation chamber 136 is sealed with an end cap 144.

A accumulation gas port 146 extends through the end cap 144 and is in fluid communication with the accumulation chamber 136. A passageway gas port 148, which includes a longitudinal gas channel, extends through the end cap 144, the accumulation chamber 136 (without being in direct fluid communication therewith), and the housing 141. The gas inlet/outlet 148 is in fluid communication with the longitudinal passageway 120, rearwardly of the piston 150 in the rest position. As for the accumulation gas port 46 and the passageway gas port 48, gas can flow in both directions (inwardly and outwardly) in both the accumulation gas port 146 and the gas inlet/outlet 148.

In the rest position, the piston 150 divides the longitudinal passageway 120 into a suction chamber 156, extending from the rear end 154 of the piston 150 towards the rear end of the passageway 120, and a propulsion channel 158, extending from the front end 152 of the piston 150 towards the front end 122 of the passageway 120.

As for the piston 50, the piston 150 has an annular groove 162 defined in its peripheral wall 160 and in which a seal 164 is provided. The seal 164 provides an air-tight connection between the piston 150 and the inner peripheral wall 118. In the rest position of the piston 150, the seal 164 is located below the gas port 140 and prevents gases from flowing from the accumulation chamber 136 into the propulsion section 158 of the passageway 120. Moreover, while the piston 150 is sliding into the passageway 120, the seal 164 prevents gases from flowing from one section of passageway to the other, i.e. either rearwardly or frontwardly of the piston 150.

In the rest position, the seal 174 prevents gases from flowing from the accumulation chamber 136 into the suction section 156 of the passageway 120.

Figure 6:
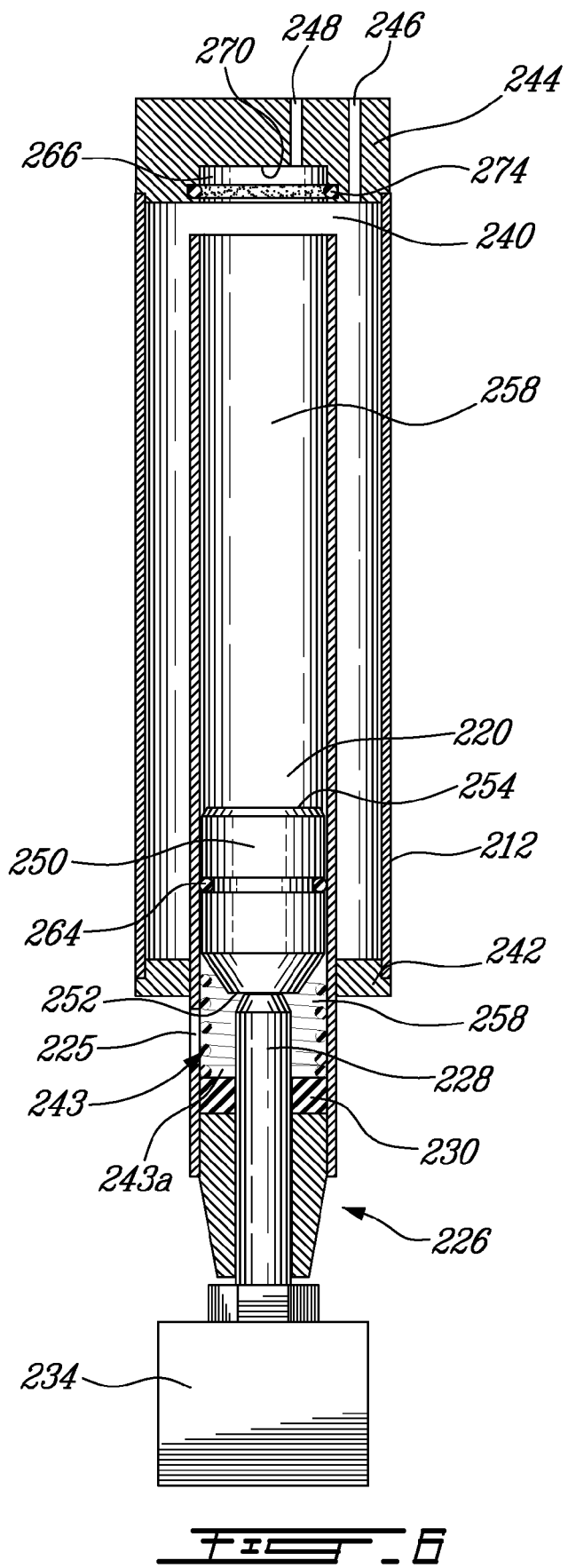
FIG. 6 is a sectional view of a pneumatic impact tool in accordance with another embodiment of the invention, wherein the piston is in an impact position and the pneumatic tool includes a biasing member.

Referring now to FIG. 6, it will be it will be seen another embodiment of the pneumatic impact tools 10, 110. The features are numbered with reference numerals which correspond to the reference numerals of the previous embodiment in the 200 series.

In this embodiment, the tool 210 includes a biasing element 243, such as a compression spring 243a provided between the piston front face 252 and the head 226, to return the piston 250 into the cavity 266 after impact. Alternately, a tension spring having a first end connected to the end cap 244 and a second end connected to the rear end 254 of the piston 250 can be provided to achieve a similar result. Therefore, once an impact has been provided on the tool 234, the biasing member 243 displaces the piston 250 and the piston 250 returns to the rest position. If the spring constant of the biasing element 243 is sufficiently important, the biasing member 243 can also maintain the piston 250 in the rest position while the accumulation chamber 236 is being filled with pressurized gas and before the tool 210 is actuated to provide an impact. It will be noted here that the biasing element can alternately be compressed air provided in the propulsion section 258 of the passageway.

During the loading part, the biasing member 243 plays a similar role than the venturi 98 (FIG. 4) in the embodiment described above.

Figure 7:
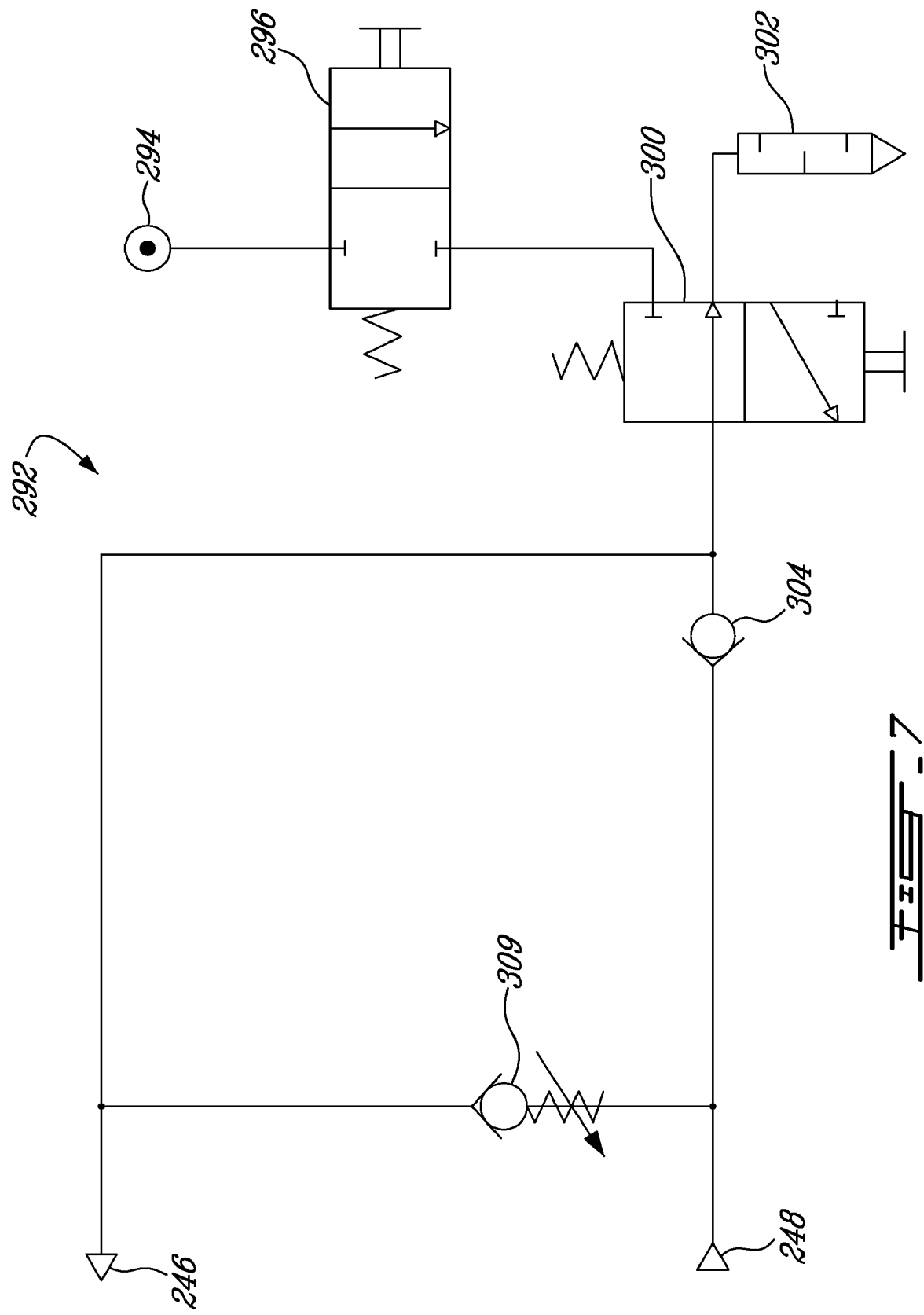
FIG. 7 is a schematic pneumatic circuit of the pneumatic impact tool shown in FIG. 6.

Referring now to FIG. 7, an embodiment of a pneumatic circuit 292 connectable to the pneumatic impact tools 210 and, more particularly, to the accumulation gas port 246 and the passageway gas port 248 for selectively blowing gas therein, is schematically depicted. The pneumatic circuit 292 includes a pressurized gas supply 294 in fluid communication with a first valve 296. The first valve 296 is a manually actuated valve movable between two configurations. In the first configuration (not illustrated), the first valve 296 allows fluid communication between the pressurized gas supply 294 and a second valve 300 and, in the second configuration (FIG. 7), the first valve 296 prevents fluid communication between the pressurized gas supply 294. The first valve 296 is biased to the second configuration. Therefore, the first valve 296 is in the first configuration to fill the accumulation chamber 236 of the tool 210 with pressurized gas. When the tool 210 is not operational, the first valve is in the second configuration.

The second valve 300 is activatable between two configurations. In the first configuration, the second valve 300 allows fluid communication between the accumulation gas port 246 and the silencer 302 (FIG. 7). In the second configuration (not illustrated), the second valve 300 allows fluid communication between the pressurized gas source 294 and the accumulation gas port 246. The second valve is preferably biased to the first configuration illustrated.

To fill the accumulation chamber 236 with pressurized gas, the first valve 296 is to be switched to the first configuration, and the second valve 300 is to be switched to the second configuration, i.e. allowing pressurized gas flow therethrough. The accumulation chamber is then filled until a threshold pressure value is achieved which releases clack valve 309 and urges piston 250 out from the cavity 266 in the manner described above.

Therefore, when the second valve 300 is switched back into the first configuration, the pressurized gas contained in the accumulation chamber 236 and passageway 220 is released through the accumulation gas port 246 and/or the passageway gas port 248, optionally through check valve 304 and out silencer 302. When the pressure in the accumulation chamber 236 and the passageway 220 is sufficiently low, the spring constant of the biasing member 243 displaced the piston 250 back into the rest position.

Then, when the piston 250 is in the rest position, fluid communication is prevented between the accumulation gas port 246 and the passageway gas port 248.

It is advantageous in certain embodiments to provide the second valve in a manner that it is activatable by abutting the head 226 on a surface.

In an alternate embodiment, the pneumatic circuit can omit the first valve, and make the second valve 300 activatable manually, either with a trigger, by abutting the head on a surface or any other actuation means, to begin an impact cycle.

The tool 10, 110, 210 can include an air pressure regulator to control the speed of the piston 50, 150, 250 inside the passageway 20, 120, 220 and the resulting impact force on the head 26, 126, 226. It can also include a timer to control the loading and unloading parts of the impact cycle and to provide several continuous impact cycles.

The activation signal can be generated manually by actuating a trigger, a push button, by abutting the head 26, 126, 226 of the tool 10, 110, 210 on a surface or the like. It can also be generated by a controller. The controller can generate periodical activation signals or solely generates activation signals when predetermined conditions are met.

It will be appreciated that the impact tool 10, 110, 210 can be used for marking, piercing, shearing, punching, forming, stamping, flanging, riveting, printing, pressing, embossing, nailing, clinching, and the like.

The tool 10, 110, 210 can be hand held or mounted to a tool holder (not shown).

The impact tool 10, 110, 210 has few moving parts and therefore requires low and easy maintenance and has a relative long service life. The manufacturing costs can advantageously be lowered compared to other types of impact tools. The impact tool 10, 110, 210 can be designed relatively compact and still provide relatively high impact force.

In selecting the ratio between the volume of the accumulation chamber and the combined volume of the suction section of the passageway with the accumulation chamber when the piston is in the impact position, there is a compromise to be chosen between the efficiency of pressurized gas usage and the impact achieved. When a low ratio is used, a greater efficiency of pressurized gas usage can be achieved, but the impact force is diminished. When a higher ratio is used, the impact force is enhanced, but the efficiency of pressurized gas usage is diminished. For illustrative purposes, in the embodiments illustrated, it was found advantageous to use an accumulation chamber which has a volume representing about 40% of the combined volume of the suction section of the passageway and the accumulation chamber when the piston is in the impact position. An appropriate ratio in alternate embodiments will be readily determined by those skilled in the art in view of the particular requirements of specific applications.

The embodiments of the invention described above are intended to be exemplary only.

Even if no additional retaining mechanism were necessary to maintain the piston 50, 150 in the rest position in the illustrated embodiments, the tool 10, 110 can optionally include a mechanical or magnetic retainer to ensure that the piston 50, 150 remains in the rest position prior to the reception of the activation signal. It can also include a rod (not shown) sliding between an extended position and a retracted position. The rod can be inserted in the inner peripheral wall 18, 118 of the tool 10, 110 in the retracted position and does not obstruct the piston displacement in the passageway 20, 120. A section of the rod can extend inside the passageway 20, 120 in the extended position and obstruct the piston displacement in the passageway 20, 120. For example, the rod can be positioned below the piston 50, 150; the front end 52, 152 of the piston 50, 150 abuts the rod. The piston 50, 150 thus remains in the rest position. An aperture can also be defined in the piston 50, 150 and a section of the rod can be inserted in the aperture for preventing undesired piston displacement. When the activation signal is received the rod slides in the retracted position, allowing the displacement of the piston 50 inside the passageway 20, 120. Once the piston 50, 150 returned in the rest position, the rod slides in the extended position, obstructing the piston displacement until another activation signal is received.

All the retaining mechanisms described above can be combined with a biasing element 243.

The aperture 40, 140, 240 can have another shape than an annular shape. For example, several gas ports can be provided which are uniformly distributed in the inner peripheral wall 18, 118, 218, separating the accumulation chamber 36, 136, 236 from the longitudinal passageway 20, 120, 220. Therefore, in the rest position of the piston 50, 150, 250, the pressure applied by a gas located in the accumulation chamber 36, 136, 236 is also uniformly distributed along the perimeter of the piston 50, 150, 250.

In the embodiments described above, the pressure in the propulsion channel 58, 158, 258 is the atmospheric pressure when the piston 50, 150, 250 is in the rest position. However, it will be appreciated that the pressure in the propulsion channel 58, 158, 258 can be either lower or higher than the atmospheric pressure.

The seals can be mounted differently than the one shown in FIGS. 1, 2, 5, and 6. For example, the seals 64, 74, 164, 174, 264, 274 can be mounted directly to the wall surface of the piston 50, 150, 250 or peripheral wall 68, 168, 268 of the cavity 66, 166, 266, i.e. without being inserted into a groove. Moreover, the seal 74, 174, 274 can be mounted to the piston 50, 150, 250. Their positions can also differ. The seals can be made of any appropriate material such as rubber and the like.

The shape of the tool 10, 110, 210 can differ from the embodiments described above. The vent 25, 125, 225, port 40, 140, 240, accumulation gas port 46, 146, 246, and passageway gas port 48, 148, 248 can be positioned differently in the tool 10, 110, 210. The shape of the piston 50, 150, 250, or hammer, can differ from the one described above.

The scope of the invention is therefore intended to be limited solely by the scope of the appended claims.

The invention claimed is:

1. A pneumatic impact tool comprising
    a housing defining a longitudinal passageway with a front end and a rear end, an accumulation chamber in fluid communication with the longitudinal passageway proximate to the rear end, an accumulation chamber gas port in fluid communication with the accumulation chamber and connectable to a pressurized fluid supply, a passageway gas port in fluid communication with the longitudinal passageway proximate to the rear end, and at least one inner gas port extending between the accumulation chamber and the longitudinal passageway; and
    a piston inserted in the longitudinal passageway and movable between an impact position wherein the piston is proximate to the front end and a rest position wherein the piston is proximate to the rear end, the piston having a rear face, a front face, opposed to the rear face, and a peripheral wall extending between the front and the rear faces,
        the peripheral wall of the piston preventing fluid communication between the longitudinal passageway and the accumulation chamber through the at least one inner gas port and the passageway gas port being in fluid communication with the longitudinal passageway, rearwardly of the piston, in the rest position of the piston, and
        the longitudinal passageway and the accumulation chamber being in fluid communication, in the impact position of the piston.

2. A pneumatic impact tool as claimed in claim 1, wherein, the at least one inner gas port is uniformly distributed and provides a uniformly distributed pressure along the peripheral wall of the piston in the rest position.

3. A pneumatic impact tool as claimed in claim 1, wherein the at least one inner gas port has an annular shape.

4. A pneumatic impact tool as claimed in claim 1, wherein the accumulation chamber is annular and concentric with the longitudinal passageway.

5. A pneumatic impact tool as claimed in claim 1, wherein the accumulation chamber gas port is connectable to the pressurized fluid supply.

6. A pneumatic impact tool as claimed in claim 1, wherein the passageway gas port is connectable to a pneumatic circuit for selectively blowing gas therein and withdrawing gas therefrom.

7. A pneumatic impact tool as claimed in claim 1, wherein the passageway gas port and the accumulation chamber gas port are connectable to a pneumatic circuit for selectively blowing gas therein and withdrawing gas therefrom.

8. A pneumatic impact tool as claimed in claim 1, comprising at least one seal mounted to one of the housing and the piston and preventing fluid communication between the longitudinal passageway and the accumulation chamber when the piston is in the rest position.

9. A pneumatic impact tool as claimed in claim 1, wherein the piston, in the rest position, divides the longitudinal passageway into a propulsion section extending from a front end of the piston to the front end of the longitudinal passageway and a rear section extending from a rear end of the piston to the rear end of the longitudinal passageway.

10. A pneumatic impact tool as claimed in claim 1, wherein the housing comprises a head, the piston abutting the head in the impact position.

11. A pneumatic impact tool as claimed in claim 1, comprising a biasing member mounted into the longitudinal passageway and pulling the piston, from the impact position, into the rest position.

12. A method for operating an impact tool, the method comprising:
maintaining a piston in a rest position proximate to a rear end of a longitudinal passageway defined in the impact tool, the piston being slidably inserted in the longitudinal passageway;
inserting pressurized gas in an accumulation chamber of the impact tool, a peripheral wall of the piston facing at least one inner gas port extending between the accumulation chamber and the longitudinal passageway prevents fluid communication therebetween;
increasing the pressure in the longitudinal passageway rearwardly of the piston, upon receiving an activation signal, to apply pressure to a rear face of the piston, the piston sliding in the longitudinal passageway from a rear position to an impact position, propulsed by the pressurized gas of the accumulation chamber flowing through the at least one inner gas port.

13. A method as claimed in claim 12, further comprising displacing the piston from the impact position into the rest position.

14. A method as claimed in claim 13, wherein displacing the piston comprises creating a pressure difference between a suction section and a propulsion section of the longitudinal passageway, the suction section and the propulsion section being separated by the piston, the pressure in the suction section being inferior to the pressure in the propulsion section.

15. A method as claimed in claim 12, wherein increasing the pressure in the longitudinal passageway comprises injecting gas in the longitudinal passageway, rearwardly of the piston in the rest position.

16. A method as claimed in claim 12, wherein maintaining the piston in the rest position comprises creating at least a partial vacuum in the longitudinal passageway, rearwardly of the piston in the rest position.

17. A method as claimed in claim 12, comprising allowing the pressurized gas, in the accumulation chamber, to flow into the longitudinal passageway for propelling the piston therealong.

18. A method as claimed in claim 12, wherein inserting pressurized gas in the accumulation chamber further comprises uniformly distributing pressure on the peripheral wall of the piston.

19. A method as claimed in claim 12, wherein the accumulation chamber is annular and concentric with the longitudinal passageway.

20. A pneumatic impact tool comprising:
a housing defining a longitudinal passageway with a rear end and a front end and a passageway gas port, proximate to the rear end and connectable to a gas supply;
an accumulation chamber having an accumulation chamber gas port connectable to a gas supply for injecting pressurized gas therein and at least one inner gas port in fluid communication with the longitudinal passageway; and
a piston inserted in the longitudinal passageway and sliding therein between a rest position wherein the piston is juxtaposed to the rear end of the longitudinal passageway, a peripheral wall of the piston seals the at least one inner gas port of the accumulation chamber and a rear face of the piston faces the passageway gas port, and an impact position wherein the piston is juxtaposed to the front end of the longitudinal passageway and the accumulation chamber and the longitudinal passageway are in fluid communication though the at least one inner gas port, the piston moving from the rest position to the impact position when gas is inserted in the longitudinal passageway though the passageway gas port and being propelled therebetween by pressurized gas contained in the accumulation chamber.

21. A pneumatic impact tool as claimed in claim 20, wherein the at least one inner gas port extends between the accumulation chamber and the longitudinal passageway, is uniformly distributed and provides a uniformly distributed pressure along the peripheral wall of the piston in the rest position.

22. A pneumatic impact tool as claimed in claim 20, wherein the passageway gas port is juxtaposed to a rear end of the piston in the rest position and gas injected therein into the longitudinal passageway applies pressure on the rear end of the piston.

23. A pneumatic impact tool as claimed in claim 20, wherein the accumulation chamber is annular and concentric with the longitudinal passageway.

24. A pneumatic impact tool as claimed in claim 20, wherein the passageway gas port is designed for withdrawing gas from the longitudinal passageway and the accumulation chamber for moving the piston from the impact position to the rest position.

25. A pneumatic impact tool as claimed in claim 20, comprising at least one biasing member connecting a rear end of the housing to a rear end of the piston for moving the piston from the impact position to the rest position.

26. A pneumatic impact tool as claimed in claim 20, wherein at least one seal mounted to one of the housing and the piston and preventing fluid communication between the longitudinal passageway and the accumulation chamber when the piston is in the rest position.

27. A pneumatic impact tool as claimed in claim 20, wherein the housing comprises a head, the piston abutting the head in the impact position.

* * * * *